(12) United States Patent
Way et al.

(10) Patent No.: US 7,721,662 B2
(45) Date of Patent: May 25, 2010

(54) APPLICATOR SYSTEM AND METHOD FOR THE AGRICULTURAL DISTRIBUTION OF BIODEGRADABLE AND NON-BIODEGRADABLE MATERIALS

(75) Inventors: Thomas R. Way, Auburn, AL (US); Marlin R. Siegford, Opelika, AL (US); Dennis E. Rowe, Starkville, MS (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 15 days.

(21) Appl. No.: 12/214,385

(22) Filed: Jun. 18, 2008

(65) Prior Publication Data

US 2009/0317192 A1 Dec. 24, 2009

(51) Int. Cl.
*A01C 7/08* (2006.01)
(52) U.S. Cl. .......................................... 111/11; 111/900
(58) Field of Classification Search ......... 111/130–133, 111/11–13, 900
See application file for complete search history.

(56) References Cited

U.S. PATENT DOCUMENTS 5,401,119 A 3/1995 Washington et al.

OTHER PUBLICATIONS

Glancey, J. L., R. K. Adams. 1996. Applicator for sidedressing row crops with solid wastes. Transactions of the ASAE 39 (3):829-835.

Khalilian, A., R. E. Williamson, M. J. Sullivan, J. D. Mueller and F. J. Wolak. 2002. Injected and broadcast application of composted municipal solid waste in cotton. Applied Engineering in Agriculture 18 (1):17-22.

Laguë, C., J. M Agnew, H. Landry, M. Roberge, C. Iskra. 2006. Development of a precision applicator for solid and semi-solid manure. Applied Engineering in Agriculture 22(3): 345-350.

Oshita, Y., K. Ganno, K. Nishiwaki and S. Hasegawa. 1996. Development of manure applicator with injection device. ASAE Paper No. 96-4075. St. Joseph, MI: ASAE.

Pote, D. H., Kingery, W. L., Aiken, G. E., Han, F. X., Moore, Jr., P. A., and Buddington, K. 2003. Water-quality effects of incorporating poultry litter into perennial grassland soils. J. Environ. Qual. 32:2392-2398.

Rodhe, L., T. Rydberg and G. Gebresenbet. 2004. The influence of shallow injector design on ammonia emissions and draught requirement under different soil conditions. Biosystems Engineering 89(2): 237-251.

*Primary Examiner*—Christopher J. Novosad
(74) *Attorney, Agent, or Firm*—John D. Fado; Robert D. Jones (57) ABSTRACT

The applicator system is designed to distribute agriculturally beneficial matter across a field. The system includes a supply reservoir and an agitator assembly that grates and abrades matter in the supply reservoir until the abraded matter precipitates out of the supply reservoir and onto a supply conveyor. The supply conveyor conveys the matter to a distribution device. The distribution device meters the matter onto at least two lateral distribution conveyors. At the end of each of the distribution conveyors the matter is funneled downwardly into an open trench created by a trenching device associated with each distribution conveyor. After the matter is deposited into the trench, a trench closing assembly directs soil back into the trench and compresses the soil surface.

27 Claims, 6 Drawing Sheets

APPLICATOR SYSTEM AND METHOD FOR THE AGRICULTURAL DISTRIBUTION OF BIODEGRADABLE AND NON-BIODEGRADABLE MATERIALS

FIELD OF THE INVENTION

This invention relates to an applicator system and method for distributing biodegradable and non-biodegradable matter. Specifically, the current invention is a method and apparatus for creating a plurality of shallow trenches and depositing matter in the trenches. In the preferred embodiment, poultry litter is deposited in the trenches.

BACKGROUND OF THE INVENTION

Approximately 8.5 billion broilers are raised and harvested by the domestic poultry industry every year. The manure by-product of the industry is mixed with absorbent materials such as pine shavings, rice hulls, or peanut hulls to create a biodegradable product commonly known as "poultry litter". The industry generates approximately 17 million tons of poultry litter per year. The litter is high in nitrogen and phosphorous and consequently makes an excellent fertilizer, however there are problems and issues associated with the agricultural application of the litter.

The most common method of applying the litter to farmland is to simply broadcast the litter across the surface of the soil. Although this method is relatively quick and inexpensive, it is inefficient and may damage the environment. To be beneficial, the nutrients within the litter must vertically penetrate the soil to reach the root systems of the associated crops. However, heavy rains may dissolve the soluble materials within the litter and carry the nutrients away from the crops and into the area watershed, thereby contaminating local lakes and streams. Further, in areas where litter is applied repeatedly to the soil surface, the chemical nutrients within the litter may become concentrated on the soil's surface so that associated crops are damaged or otherwise adversely affected. Consequently state and federal guidelines may prohibit further surface application of litter until levels of some of the potentially damaging chemicals have decreased and normalized.

An alternative approach is to trench a field and simultaneously place the litter (or other materials) into a relatively deep trench so that a greater amount of material can be deposited without the environmental problems associated with surface applications. This approach is described and exemplified by U.S. Pat. No. 5,401,119 to Washington et al (hereinafter "Washington"). However, the dimensions of the trench described in Washington preclude this method from being employed in close proximity to the root systems of crops, which could be damaged by the deep trenching process. Further, the deep trenching process is relatively slow and a significant amount of power is required to tow the Washington placement device, particularly in applications in which multiple trenching devices are employed simultaneously.

The need exists for an apparatus capable of placing poultry litter (or any other matter) at a sufficient depth so that the nutrients associated with the matter are not easily lost to runoff. The biodegradable matter should be placed at a sufficient depth to facilitate the penetration of the soil by the fertilizing elements of the matter, but shallow enough not to disturb row crops. The current invention allows the placement of biodegradable matter in multiple trenches that are two to three inches in depth and allows a side-dress application that is compatible with row crops.

SUMMARY OF THE INVENTION

The current invention comprises an applicator system and method for distributing matter. In the preferred embodiment, the applicator system distributes poultry litter in an agricultural application. The current invention includes a hopper that at least partially encloses the matter. An agitator rotor is in communication with the hopper so that the matter from the hopper is engaged by the agitator rotor. A grating means adjacent to the agitator rotor grates and abrades the matter until it precipitates out of the reservoir and onto a supply conveyor.

The supply conveyor conveys the matter away from the agitator rotor and the associated grating means and into a distribution device. A sweeping means within the distribution device sweeps the matter into a plurality of apertures in the base of the distribution device.

At least two distribution conveyors receive the matter from the distribution device and transport the matter laterally away from the distribution device. Distribution funneling assemblies receive the matter from the respective distribution conveyers and direct the matter downwardly. Individual trenching assemblies receive the matter from each of the respective distribution funneling assemblies. Each of the trenching assemblies opens a trench in the ground so that the matter from the associated funneling assembly is directed into the trench. A trench closing assembly associated with each trenching assembly directs soil displaced by the trenching assembly back into the trench and compresses the surface of the soil.

DETAILED DESCRIPTION OF PREFERRED EMBODIMENTS

The present invention comprises an applicator system for the agricultural distribution of biodegradable matter. Although biodegradable matter is preferred, matter which does not degrade (such as fly ash) should also be considered within the scope of the invention.

Figure 1:
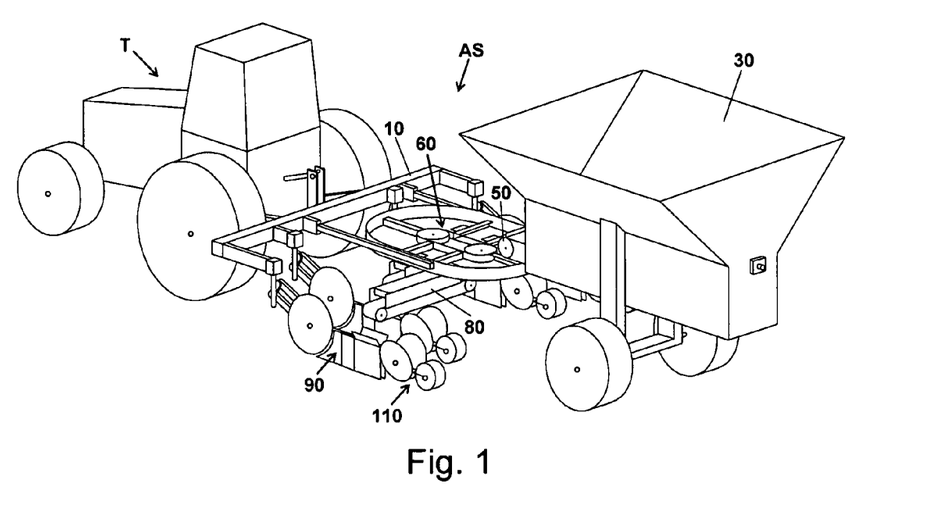
FIG. 1 is an environmental aspect view of the current invention.

FIG. 1 is a functional environmental perspective view of the applicator system AS of the current invention. In the preferred embodiment, the applicator system AS is towed across a cultivated or non-cultivated area behind a tractor T, via a tool bar 10, however, the motive force may be provided by any type of vehicle, and may include a self-propelling means.

Figure 2:
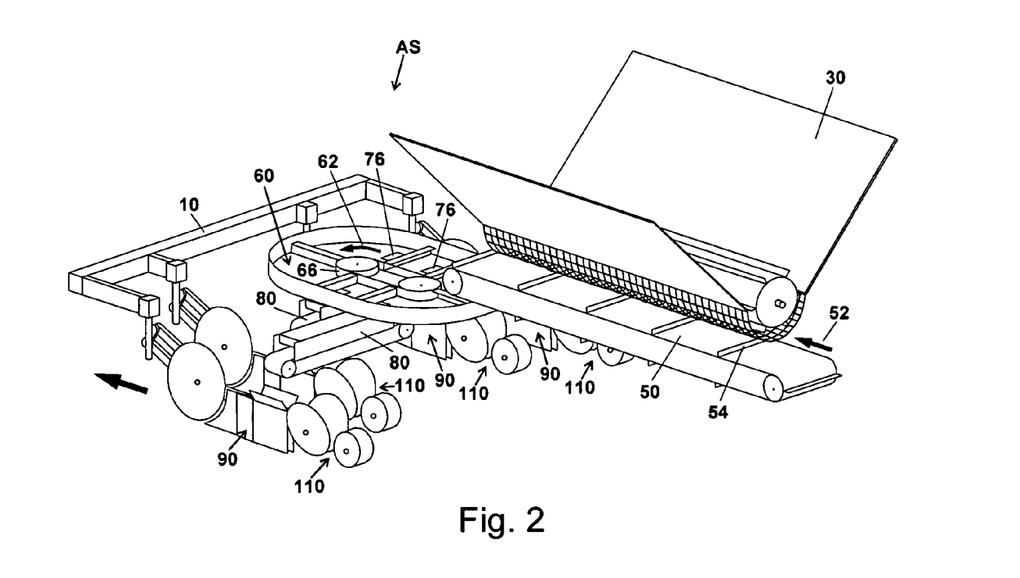
FIG. 2 is a schematic of the process described in the current invention.

FIGS. 1 and 2 provide a general operational overview of the applicator system AS. As the applicator system AS moves forward, the hopper assembly 30 delivers biodegradable matter to a supply conveyor 50. The supply conveyor 50 transports the matter in the direction of the arrow 52 (FIG. 2) and deposits the matter into a carousel-type distribution device 60. The distribution device rotation assembly 66 sweeps the biodegradable matter in the direction of the arrow 62 so that portions of the matter are deposited through the passages 76 and on to one of four distribution conveyor systems 80. At the end of the distribution conveyor system 80 the biodegradable matter is deposited into a trench created by a trenching assembly 90. A trench closing assembly 110 directs the soil back into the trench after the biodegradable matter has been deposited. Each of the major components of the applicator system AS will be described in greater detail in the following paragraphs.

Figure 3:
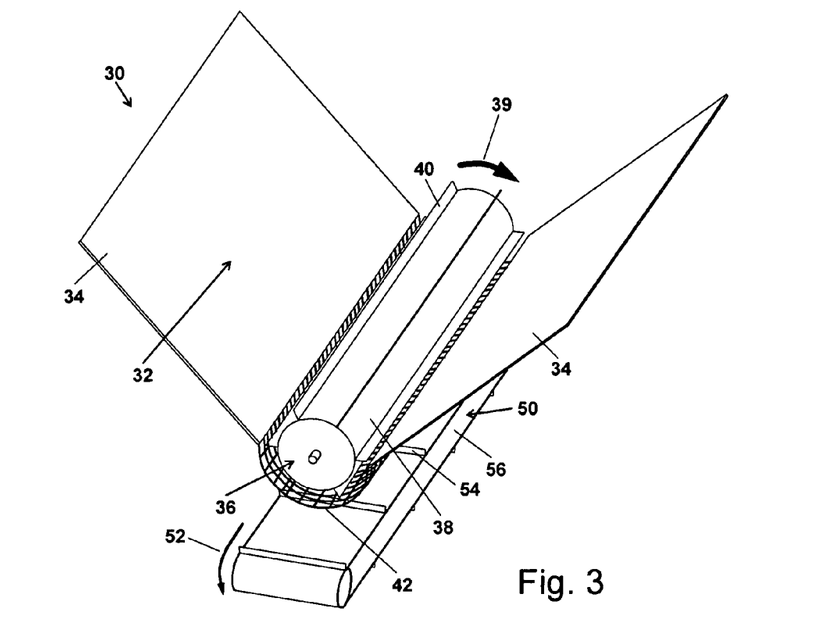
FIG. 3 is a front perspective view (from above) of the agitator assembly and hopper of the current invention in accordance with the preferred embodiment.

As best shown in FIG. 3, in the preferred embodiment, the hopper assembly 30 is comprised of a storage reservoir 32 with generally angular walls 34 so that the biodegradable matter is gravity-fed to a rotor assembly 36 that is positioned at the vertex of the reservoir's angular walls 34. The rotor assembly 36 includes a rotating shaft 38 with a plurality of rotor blades 40 positioned adjacent to a grating screen 42. Specifically, the grating screen 42 is oriented to be concentric with the lower perimeter of the arc of the rotor blades 40. Opposite edges of the grating screen 42 are connected to the lower edge of each of the reservoir's angular walls 34.

As shown in FIG. 3, in operation, biodegradable matter is gravity-fed by the reservoir's angular walls 34 into the rotor assembly 36. As the rotor shaft 38 turns in the direction of the arrow 39, the rotor blades 40 force the biodegradable matter downwardly against the grating screen 42. As the matter is forced downwardly, it is sifted through the screen 42 and precipitates out of the storage reservoir 32. Large aggregations or masses of biodegradable matter that are not initially small enough to pass through the screen 42 are grated and abraded as the rotor blades 40 force the matter against the grating screen 42. Eventually the churning and abrading process breaks up and disperses any remaining clumps of the biodegradable material.

Figure 4:
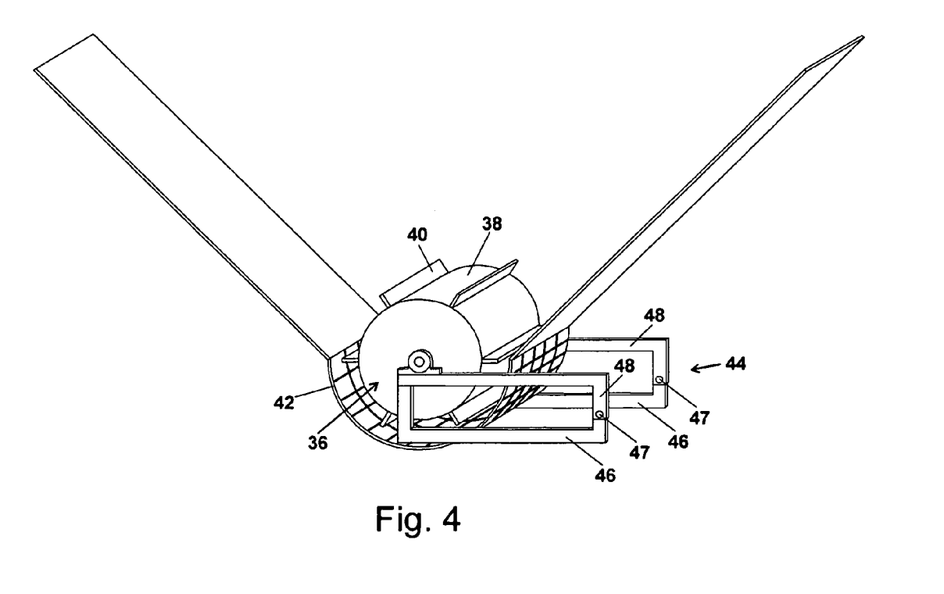
FIG. 4 is a front perspective view of the agitator and hopper showing a truncated rotor and a pivoting frame assembly.
Figure 5:
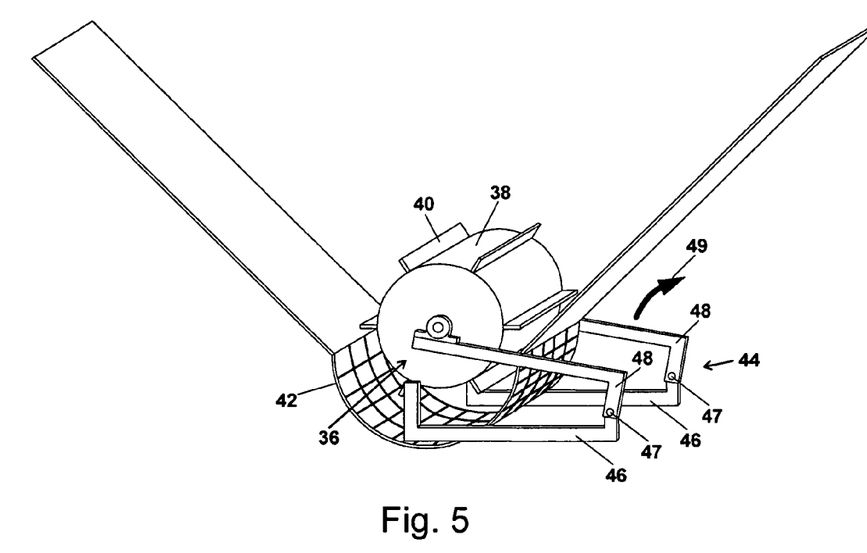
FIG. 5 is a front perspective view of the agitator of FIG. 4 showing the frame pivoted upwardly.

Occasionally a relatively large, hardened, non-abradable mass is inadvertently mixed with the biodegradable matter in the storage reservoir 32. The introduction of a large rock or metal object (for example) into the rotor assembly 36 may cause severe damage to the assembly 36. Consequently, one aspect of the current invention is a pivoting frame mechanism 44, as best shown in FIGS. 4 and 5. The pivoting frame mechanism 44 is comprised of a base member 46 and a pivoting member 48 that are joined at pivot point 47.

FIG. 4 shows the rotor system 36 in the normal operating position. However, as best shown in FIG. 5, when the rotor assembly 36 encounters a large non-abradable object, the pivoting member 48 may rotate upwardly in the direction of the arrow 49 so that the gap between the arc of the rotor blades 40 and the grating screen 42 is increased, thereby allowing the non-abradable object to pass.

In an alternative embodiment, the pivoting member 48 may have a shock-absorber type configuration so that the pivoting member 48 may contract and/or elongate as required to relieve the stress at the pivot point 47. In a further embodiment, the pivoting member 48 may be spring-biased downwardly toward the grating screen 42 to increase the pressure on the biodegradable matter between the rotor blades 40 and the screen 42, and thereby enhance the effectiveness of the grating screen 42.

Figure 6:
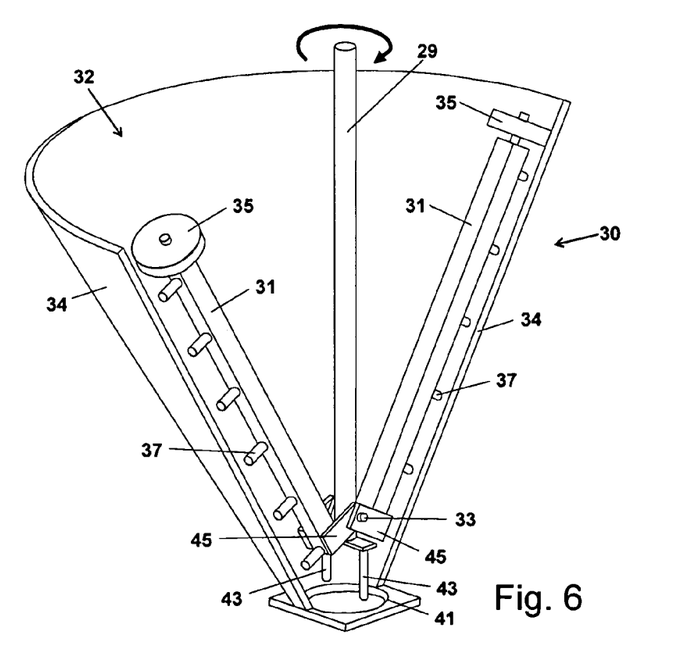
FIG. 6 is a front perspective partial sectional view of an alternative embodiment of the agitator and storage reservoir.

FIG. 6 shows an alternative embodiment of the hopper assembly 30. In the alternative embodiment, the interior of the storage reservoir 32 has a generally conical shape so that the biodegradable material is funneled downwardly. At least two wing members 31 and a vertical agitator shaft 29 extend into the conical reservoir 32.

The agitator shaft 29 is driven by a hydraulic motor or the like (not shown) positioned at the top of the shaft 29. The agitator shaft 29 extends downwardly along the vertical centerline of the conical storage reservoir 32. The wing members 31 are attached to the lower end of the agitator shaft 29 via a linkage assembly 45 and a pivotable pin joint 33. Wheels 35 mounted to the upper end of each wing member 31 allow each wing member 31 to sweep close to the inner surface of the angular walls 34 of the storage reservoir 32 without dragging on the surface of the walls 34. Agitator pegs 37 extend from each of the wing members 31 to facilitate the abrasion process. An aperture 41 in the bottom of the reservoir 32 allows biodegradable matter to flow out of the storage reservoir 32.

In operation, the wing members 31 are initially positioned vertically so that the wheels 35 are adjacent the agitator shaft 29. As the wing members 31 begin to rotate, they move outwardly toward the angular walls 34 of the reservoir 32. As the wing members 31 continue to rotate, they abrade the biodegradable matter in the storage reservoir 32 so that abraded matter precipitates through the aperture 41 and out of the reservoir 32. A base rotary component 43 attached to the lower end of the vertical agitator shaft 29 rotates with the agitator shaft 29 and reduces any tendency for clumps of matter to bridge and clog the aperture 41. In the preferred embodiment, the base rotary component 43 has an inverted U-shape.

In further alternative embodiments, the hydraulic motor may be positioned below the reservoir 32 and the agitator shaft 29 may extend upwardly into the reservoir.

As best shown in FIGS. 2 and 3, the biodegradable matter passes through the hopper assembly 30 and is deposited on the supply conveyor 50. In the preferred embodiment, the supply conveyor 50 extends the length of the grating screen 42 and deposits the biodegradable matter into the distribution device 60. The supply conveyor 50 of the preferred embodiment is a belt-type conveyor with flow-enhancing projections 54 extending laterally across the conveyor belt 56. In alternative embodiments, the supply conveyor 50 may be of any type known in the art consistent with the function of moving the biodegradable material from the hopper assembly 30 to the material distribution device 60.

Figure 7:
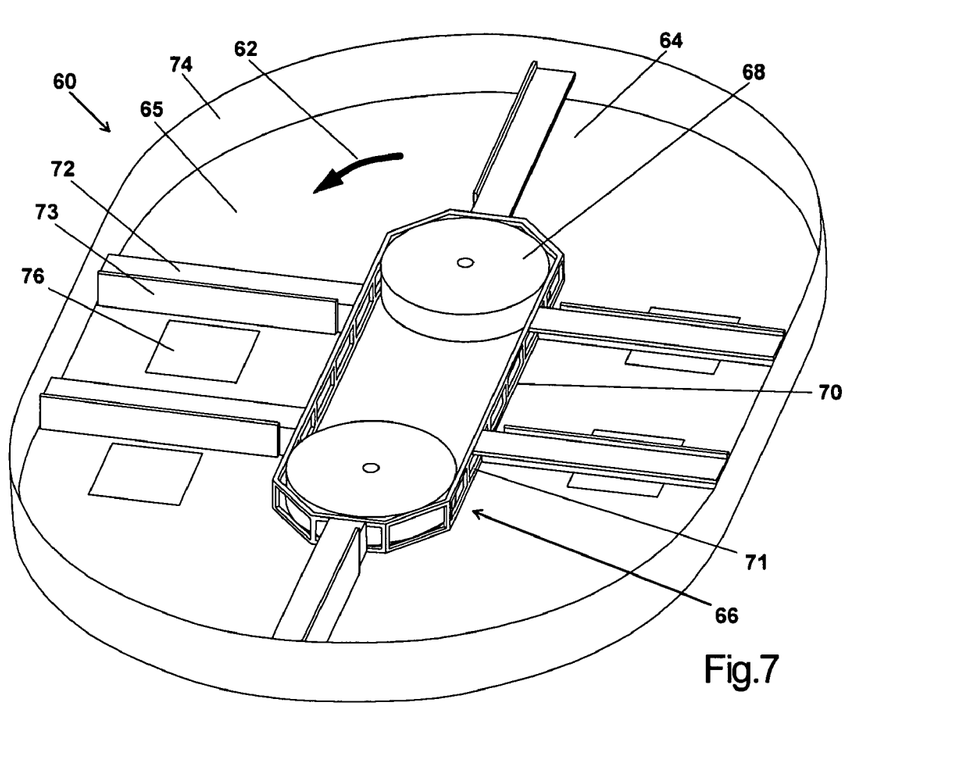
FIG. 7 is a front perspective view (from above) of the material distribution device.

As shown in FIG. 7, in the preferred embodiment, the distribution device 60 is an oval carousel-type mechanism. Biodegradable matter is deposited in the receiving end 64 of the distribution device 60 and swept around the oval base 65 in the direction of the arrow 62 by the distribution device rotation assembly 66. The rotation assembly 66 is comprised of at least two sprockets 68 connected by an endless chain 70. The rotation assembly 66 also includes a plurality of sweeping bars 72 that extend from the chain 70.

As shown in FIG. 7, the sweeping bars 72 are spaced around the oval orbit of the chain 70. The inwardly facing end of each sweeping bar 72 is connected directly to support link 71 in the chain 70 so that each sweeping bar 72 extends normal to the associated support link 71. In the preferred embodiment, the sweeping bars 72 are linear pieces of inverted "L" shaped angle iron.

The leading edge of the sweeping bars 72 may include a plastic extension 73 that slides across the distribution device base 65 as the sweeping bars 72 rotate. The plastic extension 73 reduces the frictional drag on the sweeping bars 72 and also reduces adhesion of the biodegradable matter to the sweeping bars 72. The device 60 may also include a housing (not shown) that covers the sprockets 68 and chain 70 and prevents the biodegradable material from interfering with the sprockets 68 and chain 70 and generally accumulating in the center of the base 65.

As shown in FIG. 7, the distribution device 60 also includes a retaining wall 74 disposed around the perimeter of the base 65. The outer edge of the sweeping bars 72 pass adjacent to the retaining wall 74. The function of the retaining wall is to ensure that the biodegradable material is retained within the distribution device 60. As the sweeping bars 72 rotate, the biodegradable matter is swept into one of a plurality of passages 76 and out of the distribution device 60.

In alternative embodiments, the sweeping bars 72 may be rotated by any means known in the art, and the shape of the bars 72 may be modified to enhance the sweeping process. For example, the sweeping bars 72 may have a "V" or a semicircular shape so that the matter at the edges of the bars 72 is directed toward the center portion of the bars 72. The shape of the bars' 72 cross section may also be modified as required.

Further, although the passages 76 are shown as rectangular and positioned to coincide with the center of the sweeping bars, in alternative embodiments the shape and position of the passages 76 may be modified. The shape of the passages 76 may include any shape known in the art, and the size of the passages 76 may be enlarged or contracted as required by a specific application. Additionally, the specific position of the passages 76 may also be varied so that an individual passage 76 may be positioned adjacent the retaining wall 74, adjacent the chain 70, or in an intermediate area between the retaining wall 74 and the chain 70.

Figure 8:
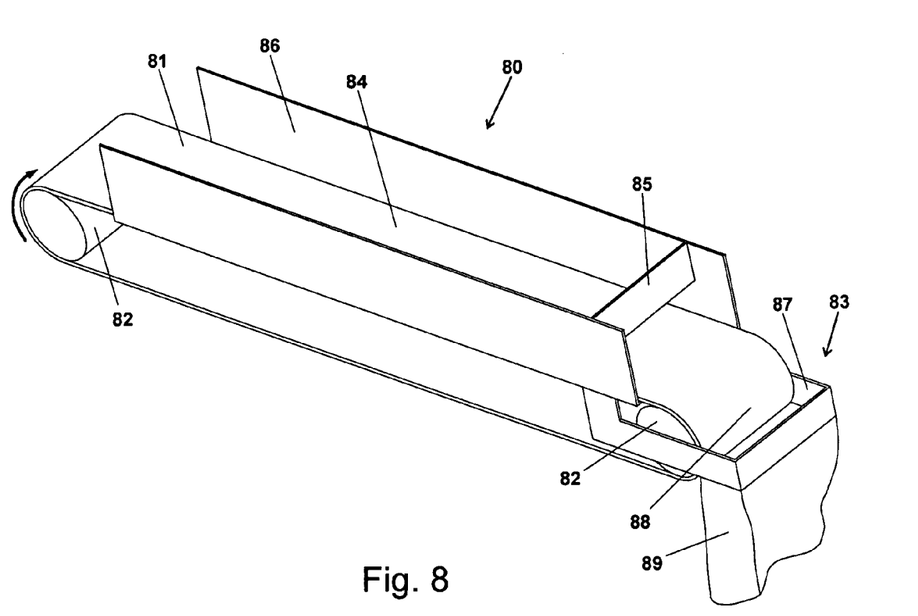
FIG. 8 is a front perspective view (from above) of the distribution conveyor assembly.

After the biodegradable material passes through the passage(s) 76, it is deposited onto one of the distribution conveyor systems 80. FIG. 2 shows the position of the distribution device 60 relative to the distribution conveyor system 80 in accordance with the preferred embodiment. FIG. 8 shows the configuration of one of the individual distribution conveyor systems 80. Although the preferred embodiment includes four distribution conveyor systems 80 corresponding with four passages 76, a greater or lesser number of conveyors 80 and corresponding passages 76 should be considered within the scope of the invention.

As shown in FIG. 8, the distribution conveyor system 80 includes a mesh chain conveying assembly 81. The mesh chain conveying assembly 81 comprises two sets of conveyor sprockets 82 that rotate a mesh chain 84. The mesh chain conveying assembly 81 primarily operates within an elongated trough 86. A strike-off plate 85 extends laterally across the trough 86 and essentially limits the depth (and consequently the volume) of the biodegradable matter traveling down the conveyor system 80.

As the matter leaves the delivery end 88 of the mesh chain conveying assembly 81, it is directed downwardly by a distribution funneling assembly 83 shown in FIG. 8. The distribution funneling assembly 83 is comprised of a retaining shield 87 and a flexible curtain 89. The retaining shield 87 is attached to the elongated trough 86 on the delivery end 88 of the mesh chain conveying assembly 81. The retaining shield 87 directs the flow of the biodegradable matter downwardly into the flexible curtain 89. The flexible curtain 89 is appended to the lower edge of the retaining shield 87 and directs the material further downwardly into the trench created by the trenching assembly 90.

Figure 9:
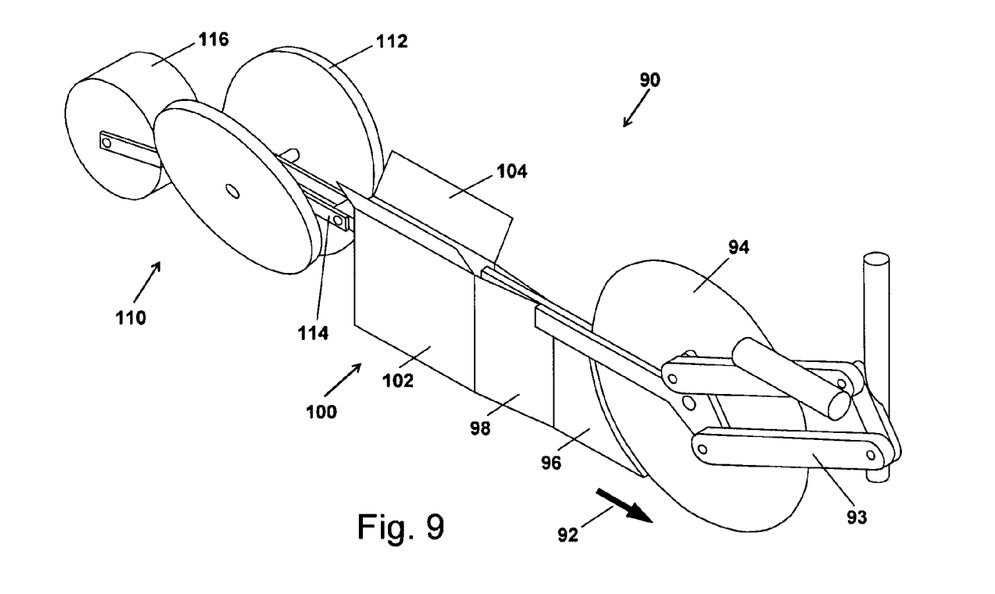
FIG. 9 is a front perspective partial sectional view (from above) of the trenching assembly of the current invention.

FIG. 9 shows the specific configuration of the trenching assembly 90. As the applicator system AS is propelled in the direction of the arrow 92, the leading edge of a coulter disc 94 initially breaches the soil. The coulter disc 94 is immediately followed by a trenching blade 96 which slides into the fissure created by coulter disc 94. The lower edge of the coulter disc 94 is generally positioned just below the lower edge of the trenching blade 96 so that the trenching blade 96 will not snag on rocks and other solid objects. This configuration enables the trenching blade 96 to ride up over obstacles and prevents damage to the trenching assembly 90.

The leading edge of the trenching blade 96 is contoured to be concentric with the lower trailing edge of the coulter disc 94. In the preferred embodiment, there is an approximately one sixteenth-inch gap between the leading edge of the trenching blade 96 and the trailing edge of the coulter disc 94. The relatively close positioning of the coulter disc 94 to the trenching blade 96 serves to minimize accumulation of crop residue (particularly corn stalks) and soil on the leading edge of the trenching blade 96. Although a gap of one-sixteenth inch is preferred, a larger or smaller gap should be considered within the scope of the current embodiment.

As shown in FIG. 9, the trenching blade 96 is generally planar and extends away from the coulter disc 94 so that the trailing edged of the trenching blade 96 is disposed between two vertically extending trench enlargement plates 98. The trench enlargement plates 98 are angled outwardly so that they further increase the width of the trench created by the trenching blade 96 and the coulter disc 94 as the trenching assembly 90 moves in the direction of the arrow 92.

Figure 10:
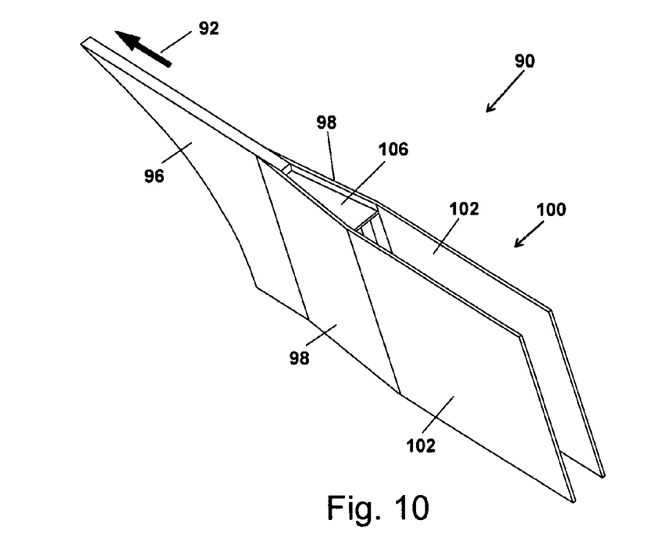
FIG. 10 is a rear perspective view (from below) of the primary components of the trenching assembly.

FIG. 10 shows a perspective view of the underside of the forward portion of the trenching assembly 90. A plastic insert 106 that extends across the bottom portion of the trench enlargement plates 98 so that soil and plant residue does not become lodged in the crevice between the trailing portion of the trenching blade 96 and the trench enlargement plates 98.

As shown in FIG. 9, a matter receiving section 100 is attached to the trailing edges of the trench enlargement plates 98. The matter receiving section 100 is comprised of two vertically extending receiving plates 102 and corresponding angular funnel plates 104. The angular funnel plates 104 direct biodegradable matter from the supply conveyor system 80 (see FIG. 8) into the trench between the receiving plates 102.

In the preferred embodiment, the funnel plates 104 are comprised of plastic or a similar flexible material. The plastic construction of the funnel plates 104 prevents damage to the plates 104 or the components of the supply conveyor system 80 if the trenching assembly 90 is unexpectedly deflected upwardly into the body of the applicator system AS.

After the matter is deposited in the trench, a trench closing assembly 110 closes the trench. The trench closing assembly 110 comprises a pair of inwardly cambered closing wheels 112, a pivoting closing wheel frame 114, and a tail wheel mechanism 116.

The inwardly cambered closing wheels 112 are positioned and angled to correspond with the location of the soil displaced by the trenching assembly 90. Specifically, the wheels 112 are positioned to contact the displaced soil on the lateral edges of the trench and direct the soil back into the trench. The wheels 112 are mounted on a pivoting frame 114 that extends longitudinally from the matter receiving section 100 of the trenching assembly 90. The frame 114 pivots downwardly and may be spring-biased so that the inwardly cambered closing wheels 112 remain in contact with the soil as the applicator system AS moves over uneven terrain.

Figure 11:
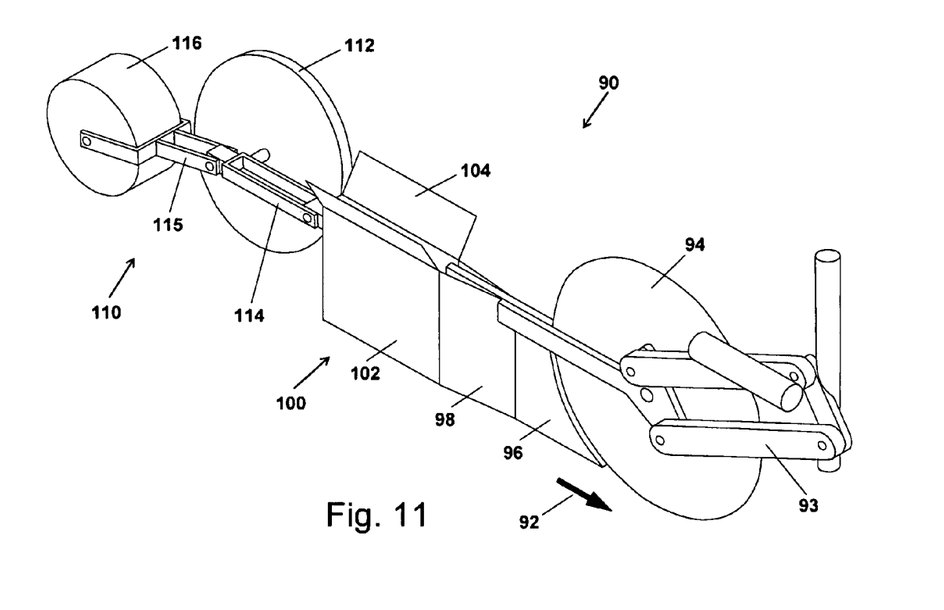
FIG. 11 is a front perspective view (from above) of the trenching assembly with the proximal inwardly cambered wheel removed.

As shown in FIGS. 9 and 11, a tail wheel mechanism 116 follows the inwardly cambered wheels 112. The tail wheel mechanism 116 flattens and compresses the surface of the soil that has been directed into the trench. The tail wheel mechanism may also incorporate a pivoting frame assembly 115 (see FIG. 11) that maintains the tail wheel 116 in contact with the soil.

As shown in FIG. 2, a toolbar 10 extends across the front portions of the trenching assemblies 90. As shown in FIGS. 9 and 11 four-bar parallel linkages 93 connect the trenching assemblies 90 to the toolbar 10. The linkages 93 allow the position of the trenching assemblies 90 to be adjusted laterally. Similarly, the mesh chain conveying assemblies 81 may be laterally adjusted so that the delivery ends 88 of the mesh chain conveying systems 81 correspond with the positions of the respective trenching assemblies 90.

In operation, as shown in FIGS. 2, 8, and 9, as the applicator system AS is propelled forward via the tool bar 10, the coulter disc 94 slices through the soil creating a narrow crease. The trenching blade 96 immediately follows the coulter disc 94. Vertically-extending trench enlargement plates 98 attached to the trenching blade 96 enlarge the trench. The biodegradable matter leaves the conveying assembly 81 and is directed downwardly by the distribution funneling assembly 83 into the matter receiving section 100. As the applicator system AS continues to move forward, the inwardly cambered closing wheels 112 direct the displaced soil back into the trench, thereby covering the deposited matter. A tail wheel mechanism 116 levels and compresses the backfilled soil.

For the foregoing reasons, it is clear that the invention provides an effective and innovative means of applying matter (preferably biodegradable poultry litter) to a planted field or in other agricultural applications. The current invention may be modified in multiple ways and applied in various technological applications. The current invention may be modified and customized as required by a specific operation or application, and the individual components may be modified, as required, to achieve the desired result. Although the materials of construction are generally not described, they may include a variety of compositions consistent with the function of the associated component. Such variations are not to be regarded as a departure from the spirit and scope of the invention, and all such modifications as would be obvious to one skilled in the art are intended to be included within the scope of the following claims.

What is claimed is:

1. An applicator system for distributing matter, the system comprising:
   a hopper at least partially enclosing the matter;
   an agitator rotor in communication with the hopper so that the matter from the hopper is engaged by the agitator rotor;
   a grating screen adjacent to the agitator rotor, the agitator rotor directing matter into the grating means so that the rotor and the grating means abrade the matter;
   a pivoting agitator frame enabling the agitator rotor to swing away from the grating screen when the agitator encounters a non-abradable object;
   a supply conveyor receiving the matter from the grating screen the supply conveyor conveying the matter away from the agitator rotor and the grating screen;
   a distribution device receiving the matter from the supply conveyor and metering output of the matter through a plurality of apertures;
   at least two distribution conveyors receiving the matter from the distribution device and transporting the matter laterally away from the distribution device;
   at least two distribution funneling assemblies, each funneling assembly receiving matter from one of the respective distribution conveyers and directing the matter downwardly;
   at least two trenching assemblies, each trenching assembly receiving matter from one of the respective distribution funneling assemblies, each of the trenching assemblies penetrating a ground surface and opening a trench in the ground surface so that the matter is directed into the trench; and
   at least two trench closing assemblies, each trench closing assembly being connected to one of the respective trenching assemblies, each trench closing assembly directing soil displaced by the associated trenching assembly back into the trench and compressing a surface of the soil;
   wherein the matter is deposited in the trench so that nutrients within the matter are able to nourish associated plants.

2. The applicator system of claim 1 wherein the hopper comprises a reservoir having at least first and second angular walls, the first angular wall being disposed opposite the second angular wall, the first and second angular walls directing the matter downwardly into the agitator rotor.

3. The applicator system of claim 2 wherein a first edge of the grating screen is connected to the first angular wall, and an oppositely disposed second edge of the grating screen is connected to the second angular wall.

4. The applicator system of claim 3 wherein the agitator rotor comprises a plurality of blades, the grating screen extending concentric with the arc of the agitator rotor blades.

5. The applicator system of claim 1 wherein the matter distribution device comprises a sweeping means that sweeps the matter into the plurality of apertures.

6. The applicator system of claim 5 wherein the sweeping means comprises:
   at least two sprockets positioned in the center of the distribution device, at least one of the sprockets driven by a motive force;
   an endless chain connecting the two sprockets;
   a plurality of support links integrated into the chain; and
   a plurality of sweeping bars, each sweeping bar extending from one of the plurality of support links;
   wherein as the chain rotates around the sprockets, the support links in the chain carry the sweeping bars in a generally circular orbit so that the sweeping bars are propelled around the distribution device and thereby sweep the matter into one of the plurality of passages.

7. The applicator system of claim 6 wherein each of the sweeping bars has a plastic leading edge so that the plastic leading edge slides across the base of the distribution device and thereby reduces the friction between a base of the distribution device and the sweeping bar.

8. The applicator system of claim 7 wherein the body of the sweeping bar is comprised of metal and has an inverted "L" cross section.

9. The applicator system of claim 6 wherein the base of the distribution device has a generally oval shape and a wall that extends around the perimeter of the oval base.

10. The applicator system of claim 9 wherein an outer end of each of the sweeping bars passes adjacent to the wall as the sweeping bars rotate around the distribution device.

11. The applicator system of claim 10 wherein the passages are rectangular and are positioned in a center portion of the sweeping bar's rotation.

12. The applicator system of claim 1 wherein each of the at least two distribution conveyors comprises:
    an endless mesh chain conveying assembly having a receiving end and an oppositely disposed distribution end; the mesh chain conveying assembly receiving the matter from the passages at the receiving end and carrying the matter laterally away from the distribution device;
    an elongated trough having first and second vertical walls, the mesh chain conveying assembly at least partially operating in the trough between the vertical walls;
    a strike-off plate extending from the first vertical wall to the second vertical wall, a selected height of the strike-off plate above the mesh chain conveying assembly controlling the height and volume of matter proceeding to the distribution end of the mesh chain conveying assembly;
    a retaining shield adjacent the distribution end of the mesh chain conveying assembly, the retaining shield directing the matter downwardly as the matter leaves the distribution end of the mesh chain conveying assembly; and
    a flexible curtain receiving the matter from the retaining shield and directing the matter further downwardly.

13. The applicator system of claim 1 wherein the distribution funneling assembly comprises a retaining shield attached to the distribution conveyor, and a flexible curtain attached to the lower edge of the retaining shield.

14. The applicator system of claim 1 wherein the trenching means comprises:
    a coulter disc cutting a crease in a soil surface as the applicator assembly moves forward;
    a trenching blade, a leading edge of the trenching being concentric with a lower trailing edge of the coulter disc, the trenching blade sliding into the crease cut by the coulter disc;
    a pair of vertical trench enlargement plates, the leading edges of each of the vertical trench enlargement plates being connected to the trenching blade, each of the trench enlargement plates angling outwardly away from the trenching blade, the trench enlargement plates creating a furrow in the soil; and
    a material receiving section comprising at least two vertical receiving plates, a leading edge of each of the vertical receiving plates being attached to a trailing edge of each one of the respective vertical trench enlargement plates, the material receiving section receiving matter from one of the at least two distribution funneling assemblies.

15. The applicator system of claim 14 wherein the lower edge of the coulter disc extends below the lower edge of the trenching blade so that the coulter disc rides up over obstacles that would otherwise snag the trenching blade.

16. The applicator system of claim 15 wherein the trenching blade has a wedge-shaped configuration.

17. The applicator system of claim 1 wherein the trench closing means comprises at least one pair of inwardly cambered closing wheels and at least one tail wheel, the inwardly cambered closing wheels directing the soil into the trench to backfill the trench and the tail wheel smoothing the surface of the backfilled trench.

18. The applicator system of claim 17 wherein the pair of inwardly cambered closing wheels is attached to a closing wheels pivoting frame, a first end of the closing wheels pivoting frame being attached to the trenching means, the closing wheels pivoting frame pivoting the closing wheels vertically so that the closing wheels maintain contact with the soil.

19. The applicator system of claim 18 further comprising a pivoting tail wheel mechanism, the pivoting tail wheel mechanism compressing the soil and ensuring that the tail wheel maintains contact with the soil.

20. An applicator system for distributing matter, the system comprising:
    a hopper assembly, the hopper assembly comprising:
        a conical reservoir for receiving matter, interior walls of the conical reservoir directing matter downwardly toward the cone vertex;
        an agitation shaft extending into the reservoir;
        a plurality of wing members extending parallel to the interior walls of the reservoir, each wing member having an inner end and an oppositely disposed outer end;
        a plurality of agitator pegs extending outwardly from the wing members;
        a plurality of wheels, each wheel attached to an outer end of a wing member;
        a linkage connecting the inner end of the wing member with the agitator shaft;
        a pivotable pin joint attaching the linkage to the agitator shaft, and
        a base rotary component attached to the agitator shaft adjacent to the pin joint;
        wherein a rotational force is applied to the agitator shaft so that the wing members, the agitator pegs, and the base rotary component abrade the matter in the reservoir;
    a matter distribution device receiving matter from the reservoir, the matter distribution device comprising a plurality of sweeping bars sweeping the matter into a plurality of passages;
    at least one distribution conveyor receiving the matter from the matter distribution device;
    at least one trenching assembly receiving the matter from one of the at least one distribution conveyors so that the material is directed into a trench in the soil; and
    at least one trench closing assembly attached to the at least one trenching assembly, the trench closing assembly directing soil displaced by the associated trenching assembly back into the trench and compressing a surface of the soil.

21. The applicator system of claim 20 wherein the base rotary component has an inverted U configuration.

22. A method of distributing matter comprising the steps of:
    providing a reservoir;
    propelling the reservoir in a forward direction;
    depositing matter in the reservoir so that the matter flows downwardly;
    directing the matter through an agitator assembly comprising an agitator rotor and a grating means so that the matter is grated and broken into small chunks;
    conveying the matter essentially parallel to the direction of travel;
    depositing the matter in a distribution device;
    sweeping the matter into one of at least two vertical passages so that the matter is precipitated onto at least two distribution conveyors, each of the at least two distribution conveyors being associated with one of the at least two vertical passages; the matter being swept around an oval base of the distribution device by a plurality of horizontally extending sweeping bars;

receiving the matter from the vertical passages and conveying the matter perpendicular to the direction of travel via a distribution conveying means;

transferring the matter from the conveying means to a distribution funnel assembly so that the matter is directed downwardly into a trenching means;

opening a trench in the ground with the trenching means so that the matter from the distribution funnel assembly is directed into the open trench;

closing the trench with a trench closing means and compressing the soil on a surface of the closed trench.

23. The method of claim 22 wherein, in the transferring and opening steps, the trenching means is comprised of a coulter disc followed by a trenching blade, attached to trench enlargement plates, and a material receiving section attached to the trench enlargement plates.

24. The method of claim 22 wherein, in the closing step, the trench closing means is comprised of a pair of inwardly cambered closing wheels and a tail wheel mechanism.

25. The method of claim 24 wherein the inwardly cambered wheels are connected to the trenching means by a pivoting frame which ensures that the inwardly cambered wheels maintain contact with the soil as the applicator system moves in the forward direction.

26. A method of distributing matter comprising:

providing a reservoir having an inverted conical shape so that a vertex of the inverted cone is oriented downwardly, the reservoir having an aperture at the vertex of the conical reservoir;

extending an agitation shaft into the reservoir;

positioning a plurality of wing members in the reservoir in an essentially vertical position, each of the wing members having an upper end and a lower end, the lower end being connected to the agitator shaft adjacent the vertex of the conical reservoir, the upper end comprising an axle, a wheel being attached to the axle, the wheel being positioned adjacent the agitator shaft;

appending a base rotary component to the shaft adjacent the aperture;

depositing matter in the reservoir so that the matter flows downwardly around the agitator shaft and wing members and toward the aperture at the vertex of the conical reservoir;

rotating the agitator shaft, the wing members abrading the matter as the wing members rotate, the base rotary component rotating with the agitator shaft to ensure that the aperture does not become clogged;

continuing to rotate the agitator shaft, the upper end of the wing members moving away from the agitator shaft to a position between the agitator shaft and inner walls of the reservoir;

further rotating the agitator shaft, the wing members moving away from the agitator shaft until the wheels contact the inner walls of the reservoir and all the matter precipitates through the aperture and out of the reservoir;

receiving the matter precipitating out of the reservoir on a supply conveyor and conveying the matter to a matter distribution device;

sweeping the matter in the distribution device into at least one passage so that the matter is precipitated through the passage and onto a distribution conveyor;

conveying the matter via a distribution conveying means;

transferring the matter from the distribution conveying means to a distribution funnel assembly so that the matter is directed downwardly and into a trenching means;

opening a trench in the ground with the trenching means so that matter from the distribution funnel assembly is directed into the open trench;

closing the trench with a trench closing means and compressing the soil on a surface of the closed trench.

27. The method of claim 26 wherein, in the positioning step, the wing members further comprise agitator pegs extending outwardly from the wing members.

* * * * *